United States Patent
Moshchuk et al.

(10) Patent No.: US 9,318,023 B2
(45) Date of Patent: Apr. 19, 2016

(54) SYSTEM AND METHOD FOR COLLISION AVOIDANCE MANEUVER PATH DETERMINATION WITH JERK LIMIT

(75) Inventors: Nikolai K. Moshchuk, Grosse Pointe, MI (US); Shih-Ken Chen, Troy, MI (US); Chad T. Zagorski, Clarkston, MI (US); Aamrapali Chatterjee, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 13/222,499

(22) Filed: Aug. 31, 2011

(65) Prior Publication Data
US 2013/0054128 A1   Feb. 28, 2013

(51) Int. Cl.
| | |
|---|---|
| G08G 1/16 | (2006.01) |
| B60W 10/18 | (2012.01) |
| B60W 10/20 | (2006.01) |
| B60W 30/09 | (2012.01) |
| B62D 15/02 | (2006.01) |
| B60W 30/08 | (2012.01) |
| G01S 13/93 | (2006.01) |

(52) U.S. Cl.
CPC .............. *G08G 1/167* (2013.01); *B60W 10/18* (2013.01); *B60W 10/20* (2013.01); *B60W 30/09* (2013.01); *B62D 15/0265* (2013.01); *B60W 30/08* (2013.01); *G01S 13/93* (2013.01); *G01S 13/931* (2013.01); *G01S 2013/9342* (2013.01); *G08G 1/16* (2013.01); *G08G 1/165* (2013.01); *G08G 1/166* (2013.01)

(58) Field of Classification Search
CPC ......... G08G 1/16; G08G 1/167; G08G 5/045; G08G 1/165; G08G 1/166; B60W 10/18; B60W 10/20; B60W 30/08; B60W 30/09; B60W 30/0953; B60W 2550/306; B60W 10/08; B60W 10/09; B62D 15/0265; B60T 8/17558; B60K 31/0008; G01S 13/93; G01S 13/931; G01S 2013/9342
USPC .................................................. 701/301, 300
See application file for complete search history.

(56) References Cited

U.S. PATENT DOCUMENTS

| | | | |
|---|---|---|---|
| 6,926,374 B2 * | 8/2005 | Dudeck | B60T 7/22 303/191 |
| 7,626,533 B2 * | 12/2009 | Cong et al. | 342/70 |
| 8,725,474 B2 * | 5/2014 | Dorum et al. | 703/8 |
| 2004/0090117 A1 * | 5/2004 | Dudeck et al. | 303/191 |

(Continued)

OTHER PUBLICATIONS

Abernethy et al, Effects of Deceleration and Rate of Deceleration on Live Seated Human Test Subjects, Oct. 1977, U.S. Department of Transportation.*

(Continued)

*Primary Examiner* — Khoi Tran
*Assistant Examiner* — Robert Nguyen
(74) *Attorney, Agent, or Firm* — Mark S. Cohen; Pearl Cohen Zedek Latzer Baratz LLP

(57) ABSTRACT

In a vehicle, an optimal path curvature limited by one or more constraints may be determined. The constraints may be related to lateral jerk and one or more vehicle dynamics constraints. Based on the optimal path curvature, an optimal vehicle path around an object may be determined. The optimal vehicle path may be output to a collision avoidance control system. The collision avoidance control system may cause the vehicle to take a certain path.

10 Claims, 7 Drawing Sheets

(56) References Cited

U.S. PATENT DOCUMENTS

| | | | |
|---|---|---|---|
| 2004/0193374 A1* | 9/2004 | Hac et al. | 701/301 |
| 2008/0091318 A1* | 4/2008 | Deng et al. | 701/41 |
| 2008/0208408 A1 | 8/2008 | Arbitmann et al. | |
| 2011/0029235 A1* | 2/2011 | Berry | 701/207 |
| 2011/0098922 A1* | 4/2011 | Ibrahim | 701/208 |
| 2011/0160950 A1* | 6/2011 | Naderhirn | G05D 1/0202 701/28 |

OTHER PUBLICATIONS

E. Velenis and P. Tslotras, "Optimal Velocity Profile Generation for given Acceleration Limits; The Half-Car Mode Case," IEEE ISIE 2005.

E. Andreas. P. Jochen, et. al. "Toward autonomous collision avoidance by steering," IEEE ITSC 2007.

CN Office Action Application No. 201210317694.2 dated Nov. 3, 2014.

* cited by examiner

SYSTEM AND METHOD FOR COLLISION AVOIDANCE MANEUVER PATH DETERMINATION WITH JERK LIMIT

FIELD OF THE INVENTION

The present invention is related to vehicle collision avoidance determination based on, for example, sensor measured data, vehicle dynamics constraints, and other information.

BACKGROUND OF THE INVENTION

Many vehicles are equipped with systems and devices to semi-autonomously or autonomously control a vehicle to avoid a collision or mitigate the severity of a collision. Typical collision avoidance control systems may, for example, provide pre-collision preparation, output warning(s) to the driver when a collision threat exists, apply automated braking, fully or partially control vehicle steering of vehicle, and/or perform other functions.

Collision avoidance control systems may control the steering of a vehicle to guide the vehicle around an object that may pose a collision threat to the vehicle. Collision avoidance control systems may, for example, determine a vehicle path around an object based on sensor measured data and provide the determined vehicle path to an automated vehicle control system. Typical collision avoidance vehicle paths may subject vehicle occupants to large lateral acceleration, jerk (e.g., the rate of change of lateral acceleration), and other types of loads.

SUMMARY OF THE INVENTION

In a vehicle, an optimal path curvature limited by one or more constraints may be determined. The constraints may be related to lateral jerk and one or more vehicle dynamics constraints. Based on the optimal path curvature, an optimal vehicle path around an object may be determined. The optimal vehicle path may be output to a collision avoidance control system. The collision avoidance control system may cause the vehicle to take a certain path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
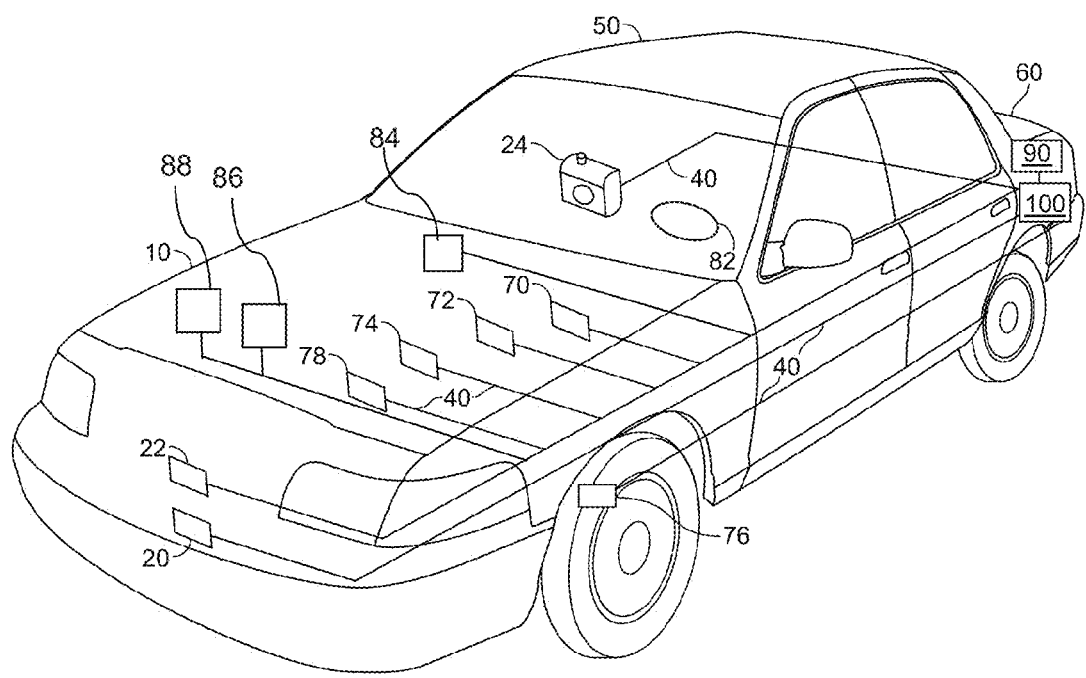
FIG. 1 is a schematic diagram of a vehicle with a collision avoidance control system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A collision avoidance control system may be a semi-autonomous driving system that controls the input to for example automated steering, differential braking, automated braking, and/or other systems. The collision avoidance control system may, for example, measure the relative location of objects (e.g., a vehicle, obstacle in the road) with respect to a vehicle (e.g., a host vehicle or other vehicle). The relative location of objects with respect to a vehicle may, for example, mean relative to the vehicle (where relative to the vehicle may in some embodiments mean relative to a specific point within a vehicle, relative to a global positioning system (GPS) system within the vehicle, relative to the center of the vehicle, etc.). If the relative distance between the host vehicle and an object is within a predefined distance and the relative velocity of the host vehicle with respect to the object or other reference is within a predefined value and/or range, a collision avoidance control system may determine that the object poses a collision threat to the vehicle. In response, the collision avoidance control system may output a signal to the driver (e.g., an audible warning), output a command to a braking system to reduce the vehicle speed, output a steering angle command to an automated steering system, and/or perform other actions.

According to some embodiments, if an object which poses a collision threat to the host vehicle is detected, the collision avoidance control system may first output a signal to the driver. If the driver does not mitigate the collision threat, the collision avoidance control system may control the vehicle to avoid the collision or mitigate the severity of the collision. The collision avoidance control system may output control commands to an automated braking system, automated steering control system, and/or other system. For example, if the relative distance between the vehicle and the object is less than a predefined threshold, automated braking may be applied to avoid collision. In some embodiments for some situations, the collision avoidance control system may determine that the vehicle could avoid collision by driving around the object.

According to some embodiments, the collision avoidance control system may calculate a desired path or optimal path around the object. Once calculated, the vehicle may be guided on the desired path by steering angle control, steering torque control, or other commands output to an automated steering control system.

The desired or optimal path may, for example, be determined or calculated based on an optimal path curvature. The optimal path curvature may, for example, be represented by, defined by, or may be a piece-wise linear function of distance and/or time (e.g., piece-wise linear optimal path curvature). For example, the piece-wise linear function may define or represent the relation between path or trajectory curvature (e.g., in units of l/m or other units) and time, between path or trajectory curvature and horizontal distance, and/or between path or trajectory curvature and another parameter or set of parameters. The piece-wise linear function may, in some embodiments, satisfy or be defined by one or more pre-defined curvature limits or constraints, one or more curvature rate limits or constraints, and/or other limits or constraints. Curvature limits or constraints may, for example, represent or be related to vehicle dynamics constraints or limits such as a vehicle lateral acceleration limit or constraint. Limits on curvature rate may, for example, represent or be related to vehicle dynamics constraints or limits such as a lateral acceleration rate limit or constraint. Lateral acceleration rate may, for example, be the rate of change of lateral acceleration or jerk of the vehicle. Other thresholds may be used.

According to some embodiments, an optimal or desired vehicle path may be determined or calculated based on the determined optimal path curvature. Optimal or desired vehicle path may, in some embodiments, be calculated based on optimal path curvature by integrating optimal path curvature twice with respect to longitudinal position (e.g., determining or calculating a second integral of optimal path curvature) or using other mathematical approaches or methods. For example, optimal vehicle path may be, may include, may lie on, or may be defined by multiple quadratic, cubic and/or other order path segments or function(s) separated by waypoints or breakpoints. Waypoints or breakpoints may, for example, be points where the character of the optimal vehicle path curve or other curve changes and may be points in which the functions defining the optimal path, the first derivative of the optimal path, and the second derivative of the optimal path are continuous. Waypoints may, for example, be determined by matching conditions for optimal vehicle path, the first derivative of optimal vehicle path, and the second derivative of optimal vehicle path at the waypoints (e.g., points or transitions between curve segments).

According to some embodiments, the optimal vehicle path may be output to a vehicle collision avoidance control system, or another vehicle control system. The collision avoidance control system may determine one or more vehicle steering angle control commands, steering torque commands, or other commands to guide the vehicle on the optimal or desired path. The collision avoidance control system may, for example, output steering angle control commands, steering torque commands, or other commands to an electrical power steering (EPS), active front steering (AFS), active rear steering, differential braking system, or other system to guide the vehicle on the optimal vehicle path.

FIG. 1 is a schematic diagram of a vehicle with a collision avoidance control system according to an embodiment of the present invention. A vehicle or host vehicle 10 (e.g., a car, truck, or another vehicle) may include a collision avoidance control system or device 100. Collision avoidance control system 100 may operate in conjunction with or separate from one or more automatic vehicle control systems, autonomous driving applications or vehicle automated steering systems 90. Vehicle automated steering system 90 may, for example, be or include an adaptive lane centering, low speed lane centering, lane keeping assist, and/or other application(s). One or more vehicle automated steering system(s) 90 may be component(s) of system 100, or vehicle automated steering system(s) 90 may be separate from system 100. Vehicle automated steering system 90 may, when engaged, fully or partially control the steering of the vehicle and alter or reduce driver (e.g., operator of the vehicle) steering control input via the steering wheel 82 and/or steering system, which may include an electrical power steering (EPS) system and/or other components.

One or more sensor(s) may be attached to or associated with the vehicle 10. A computer vision sensor (e.g., a camera) 24, light detection and ranging (LIDAR) sensor 20 (e.g., laser radar (LADAR) sensor), a radio detection and ranging (RADAR) sensor 22, or other remote sensing device may obtain data allowing system 100 to determine or measure the relative location of vehicle 10 with respect to objects (e.g., other vehicles, target vehicle(s)), lane markers(s), road shoulder(s), median barrier(s), edge of the road, and/or other features. Camera 24 may, for example, measure distance to and/or relative orientation of objects (e.g., objects which may pose a collision threat) and other vehicles (e.g., vehicles in front of vehicle 10 that may pose a collision threat). Camera 24 may, for example, measure lane offset, heading angle, lane curvature and provide the information to system 90.

In one embodiment of the present invention, vehicle 10 may include one or more devices or sensors to measure vehicle steering input, vehicle steering conditions, vehicle steering parameters, vehicle dynamics, driver input, or other vehicle related conditions or measurements. The vehicle dynamics measurement device(s) may include one or more steering angle sensor(s) 70 (e.g., connected to steering wheel 82 and/or another component of the steering system). The vehicle dynamics measurement device(s) may also include one or more accelerometer(s) 72, speedometer(s) 74, wheel speed sensor(s) 76, inertial measurement unit(s) (IMU) 78, gear shift position sensor(s) 84, gas pedal position sensor 86, brake pedal position sensor 88, or other devices. The vehicle dynamics measurement device(s) may measure driver input or vehicle dynamics parameters including lateral (i.e., angular or centripetal) acceleration, longitudinal acceleration, lateral jerk (e.g., rate of change of lateral acceleration, jolt, surge, lurch), longitudinal jerk, steering angle, steering torque, steering direction, yaw-rate, lateral and longitudinal velocity, wheel rotation velocity and acceleration, and other vehicle dynamics characteristics of vehicle 10. The measured vehicle dynamics, vehicle conditions, steering measurements, steering conditions, or driver input information may be sent or transferred to system 100 via, for example, a wire link 40 (e.g., a controller area network (CAN) bus, Flexray bus, Ethernet cable) or a wireless link. The measured vehicle dynamics, vehicle conditions, steering measurements, steering conditions, or driver input information data may be used by system 100 or another system to calculate optimal or desired path curvature, optimal or desired vehicle path, and/or other parameters.

In one embodiment of the present invention, collision avoidance control system 100 may include a computing device mounted on the dashboard of the vehicle, in passenger compartment 50, or in trunk 60. In alternate embodiments, collision avoidance control system 100 may be located in another part of the vehicle, may be located in multiple parts of the vehicle, or may have all or part of its functionality remotely located (e.g., in a remote server or in a portable computing device such as a cellular telephone).

While various sensors and inputs are discussed, in certain embodiments only a subset (e.g. one) type of sensor or input may be used.

Figure 2:
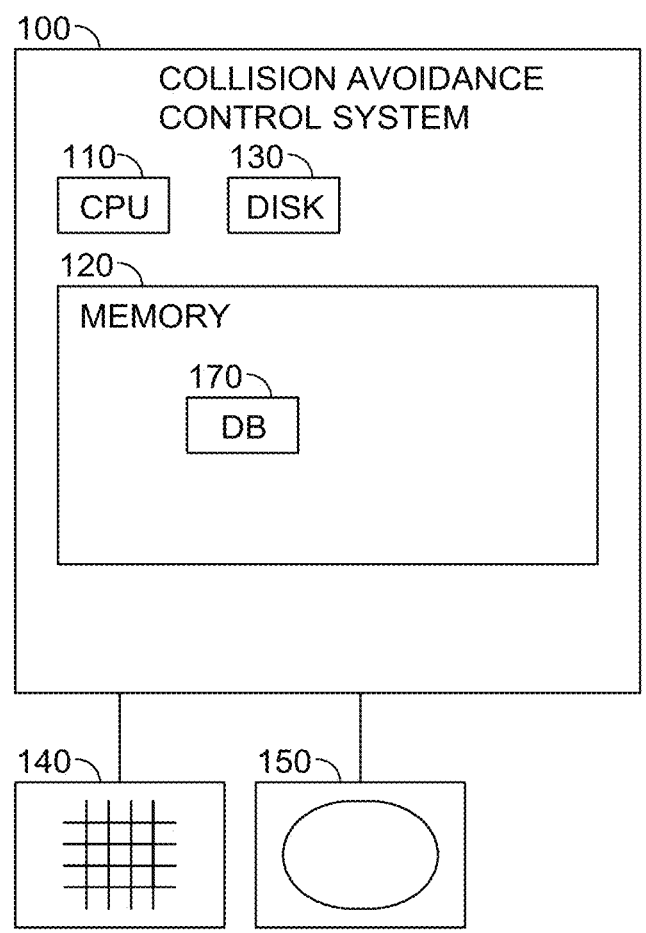
FIG. 2 is a schematic diagram of a collision avoidance control system according to an embodiment of the present invention.

FIG. 2 is a schematic diagram of a collision avoidance control system according to an embodiment of the present invention. Collision avoidance control system 100 may include one or more processor(s) or controller(s) 110, memory 120, long term storage 130, input device(s) or area(s) 140, and output device(s) or area(s) 150. Input device(s) or area(s) 140 may be, for example, a touchscreen, a keyboard, microphone, pointer device, or other device. Output device(s) or area(s) 150 may be, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, lateral acceleration limit value(s), curvature limit value(s), lateral acceleration rate limit value(s) (e.g., lateral jerk limit values), curvature rate limit value(s), object width(s) (e.g., target vehicle width), vehicle longitudinal velocity, and other information. Databases 170 may be stored all or partly in one or both of memory 120, long term storage 130, or another device.

Processor or controller 110 may be, for example, a central processing unit (CPU), a chip or any suitable computing or computational device. Processor or controller 110 may include multiple processors, and may include general-purpose processors and/or dedicated processors such as graphics processing chips. Processor 110 may execute code or instructions, for example, stored in memory 120 or long-term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3:
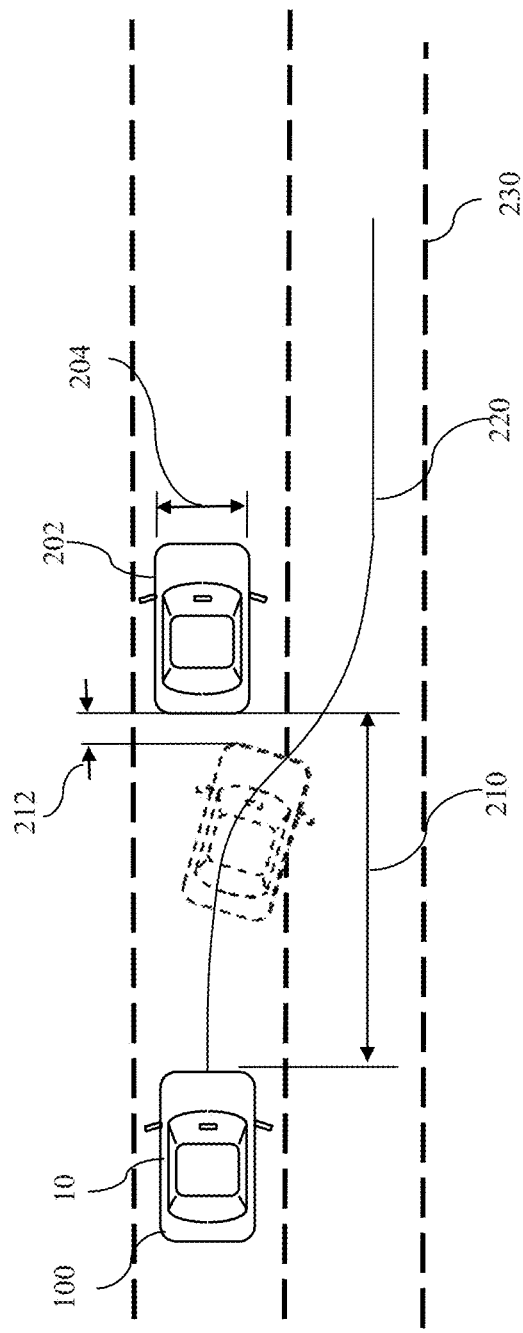
FIG. 3 is a schematic diagram of a collision avoidance control system controlling a vehicle along an optimal vehicle path according to embodiments of the present invention.

FIG. 3 is a schematic diagram of a collision avoidance control system controlling a vehicle along an optimal vehicle path according to embodiments of the present invention. Collision avoidance control system 100 may be passive or operate in the background during normal vehicle operation. System 100 may become active when, for example, vehicle sensor data indicates likelihood of imminent collision, a collision threat, or at other times. For example, a vehicle 10 may approach or encounter an object 202 (e.g., a vehicle, stationary object, or other obstacle of object or vehicle width 204) in the road. If vehicle 10 is within a predefined distance to the object 202 that poses a collision threat, within a predefined velocity range, and/or within a predefined acceleration range, system 100 or other systems associated with vehicle 10 may, for example, provide pre-collision preparation and/or warnings to the driver of vehicle 10. The warnings to driver of vehicle may be a signal, for example, an audible warning, a warning light or other form of warning. If the driver does not mitigate the collision threat, collision avoidance control system 100 may control vehicle 10, for example, through automated steering control, automated braking, and/or other controls or maneuvers in order to avoid obstacle 202 or mitigate the impact between vehicle 10 and object 202. Automated braking may, for example, include common or typical braking (e.g., applying all brakes simultaneously), differential braking (e.g., applying brakes on each wheel independent of other wheel brakes), and/or another braking system or method. Common braking may, for example, be used to control vehicle 10 in a longitudinal direction. Differential braking may, for example, be used to control vehicle 10 in both longitudinal and lateral directions.

Which evasive maneuver or actuation system (e.g., automated steering, differential braking, automated braking, or other system) collision avoidance control system 100 employs may be based on, for example, the velocity of vehicle 10, relative distance between vehicle 10 and object 202, other objects in the road, dimensions of the road, curvature of the road, and other factors. For example, if vehicle 10 is within a predefined steering maneuver threshold distance 210, it may not be possible for vehicle 10 to drive According to some embodiments, collision avoidance control system 100 may determine that vehicle 10 may avoid collision with object 202 by maneuvering around the object. Collision avoidance control system 100 may, for example, determine or calculate an optimal or desired vehicle path 220 around object 202. Optimal vehicle path 220 may, for example, be a path that guides vehicle 10 around object 202 with the least distance between vehicle 10 and object 202. For example, optimal path 220 may minimize the longitudinal distance 210 between object 202 and vehicle 10 at the start or beginning of the collision avoidance maneuver. The minimum longitudinal distance may be a distance which minimizes the relative distance between vehicle 10 traveling on optimal vehicle path 220 and the object 202. In some embodiments, a margin (e.g., 0.5 meters or another value) may be included in or added to the least distance between vehicle 10 and object 202 to account and/or compensate for uncertainties (e.g., sensor measurement error, road conditions, vehicle conditions, and/or other uncertainties). Optimal path 220 may guide or steer vehicle 10 away from object 202 and onto a target trajectory (e.g., into a target lane 230).

Optimal vehicle path 220 may, for example, be a path that guides vehicle 10 around object 202 with the least distance between vehicle 10 and object 202 such that vehicle collision avoidance is minimally intrusive and activated only when needed. A collision avoidance maneuver following optimal path 220 may, in some embodiments, be an uncomfortable maneuver for vehicle occupants.

Optimal path 220 may, for example, be determined, calculated, and/or computed by minimizing longitudinal distance 210 between vehicle 10 and object 202 subject to vehicle dynamics (e.g., lateral acceleration, lateral acceleration rate) and/or other limits or constraints. Optimal path 220 around the object may, for example, be determined based on an optimal vehicle trajectory curvature or optimal path curvature. Optimal path 220 may follow or lie on a smooth curve (e.g., a second order, parabolic curve, and/or continuous curve including second order, parabolic and/or curves or segments of another order).

Figure 4:
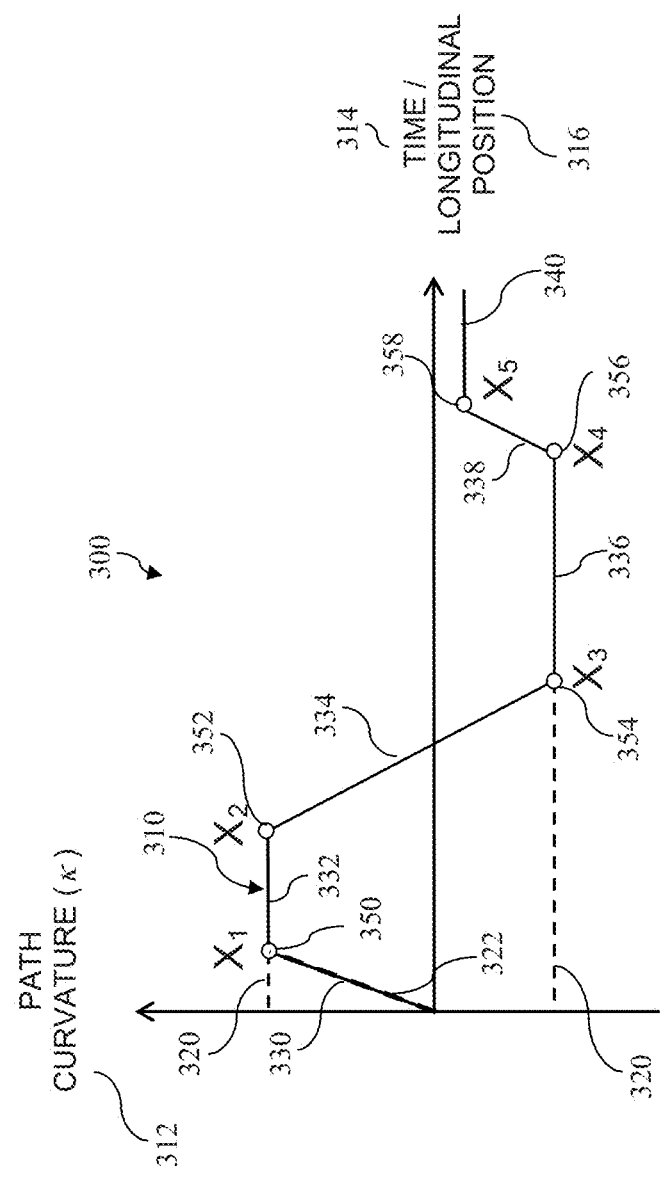
FIG. 4 is a graph of path curvature versus time or position representing an optimal path curvature around an object according to embodiments of the present invention.

FIG. 4 is a graph of path curvature versus time or position representing an optimal path curvature around an object according to embodiments of the present invention. Optimal path 220 may, for example, be determined based an optimal path curvature 310 (e.g., desired trajectory curvature, desired path curvature). Optimal or desired path curvature 310 may, for example, define the curvature or trajectory curvature of the optimal vehicle path 220 away from and/or around object 202. Optimal path curvature 310 may, for example, be a function of or be related to path curvature or trajectory curvature 312, $\kappa$, (e.g., in l/meters (1/m) or other units) and time 314 (e.g., in seconds (s) or another unit of time). Optimal path curvature 310 may, in some embodiments, be a function of or be related to path curvature or trajectory curvature 312, $\kappa$, and longitudinal distance 316 (e.g., in meters (m) or other units of distance).

Optimal path curvature 310 may, for example, be determined by minimizing longitudinal distance 210 between vehicle 10 and object 202 at the start of the vehicle maneuver around object 202 subject to, limited by, and/or constrained by one or more constraints. Constraints (e.g., path curvature constraint 322, path curvature rate constraint 320) may, for example, be related to vehicle dynamics constraints which may, for example, include lateral acceleration limit(s) or constraint(s), $a_{ymax}$, lateral acceleration rate or jerk limit(s) or constraint(s), $$\left(\frac{da_y}{dt}\right)_{max} = \eta_{max},$$

and/or other parameters. Other path calculation or determination methods may be used.

Other limits or constraints may be used.

Longitudinal distance 210 between vehicle 10 and object 202 may, for example, be determined based on a sensor (e.g., computer vision sensor 24, LIDAR sensor 20 or other sensor(s)) measured relative location of object 202 (e.g., target vehicle) with respect to vehicle 10 (or absolute location). A minimum longitudinal distance 212 between vehicle 10 and object 202 at the start of a maneuver around an object may be calculated based on a measured relative location of object 202 with respect to vehicle 10 and/or longitudinal distance 210. For example, minimum longitudinal distance 212 may be a distance which minimizes the relative distance between vehicle 10 traveling on optimal vehicle path 220 and object 202. Minimum longitudinal distance 212 may, for example, be calculated or determined by system 100 and may be based on vehicle testing, vehicle dynamics characteristics, and/or other factors.

Lateral acceleration constraint, $a_{ymax}$, may, for example, be a vehicle dynamics constraint and may be determined during vehicle dynamics testing, manufacturing, human factor studies, and/or using other methods. Lateral acceleration constraint may, for example, be determined based on vehicle stability and/or vehicle dynamics parameters. Lateral acceleration constraint, $a_{ymax}$, may, in some embodiments, be 6 meters per second squared (m/s²), another value, or other range of values. Other limits and/or constraints may be used.

Lateral acceleration rate constraint (e.g., jerk, jolt, surge, or lurch constraint), $\eta_{max}$, may, for example, be determined during vehicle dynamic testing, manufacturing, human factor studies, and/or using other methods. Lateral acceleration rate constraint, $\eta_{max}$, may, in some embodiments, be determined based on human safety studies and may, for example, be a vehicle lateral acceleration rate which would not substantially harm and/or influence vehicle occupants. Lateral acceleration rate constraint, $\eta_{max}$, may, for example, be 1-2 m/s³ (e.g., 1-2 g/s), another value, or range of values. Other limits and/or constraints may be used.

According to some embodiments, path curvature or trajectory curvature 312, $\kappa$, may be related to vehicle lateral acceleration, $a_y$, and vehicle longitudinal velocity, V, by an equation such as:

$$\kappa = \frac{a_y}{V^2}$$

In some embodiments, it may be assumed that the magnitude of vehicle longitudinal velocity, V, may remain constant or approximately constant throughout or during the collision avoidance maneuver. According to some embodiments, assuming the magnitude of vehicle longitudinal velocity, V, may be constant or roughly constant, the derivative of an equation defining trajectory curvature 312, $$\kappa = \frac{a_y}{V^2},$$

may be determined. In some embodiments, the rate of change of path curvature or time derivative of path curvature, $$\frac{d\kappa}{dt},$$

may be related to lateral acceleration rate, $$\frac{da_y}{dt} = \eta,$$

by an equation such as:

$$\frac{d\kappa}{dt} = \frac{\eta}{V^3}$$

According to some embodiments, lateral acceleration rate, $\eta$, may be constrained by the lateral acceleration rate constraint, $\eta_{max}$. The magnitude of rate of change of path curvature, $$\left|\frac{d\kappa}{dt}\right|,$$

may, for example, be constrained by, and/or related to lateral acceleration rate constraint, $\eta_{max}$, and vehicle longitudinal velocity, V, by an equation such as:

$$\left|\frac{d\kappa}{dt}\right| \leq \frac{\eta_{max}}{V^3}$$

Trajectory curvature rate limit or constraint 322, $$\frac{\eta_{max}}{V^3},$$

for example, be a maximum rate of change of trajectory curvature. The magnitude of the slope of optimal path curvature 310 may, for example, be limited or constrained by, trajectory curvature rate constraint 322, $$\frac{\eta_{max}}{V^3}.$$

According to some embodiments, lateral acceleration, $a_y$, may be limited by lateral acceleration constraint, $a_{ymax}$. The trajectory curvature 312, $\kappa$, may, for example, be limited by, constrained by, and/or related to lateral acceleration constraint, $a_{ymax}$ and vehicle longitudinal velocity, V, by an equation such as:

$$\kappa \le \frac{a_{ymax}}{V^2}$$

Trajectory curvature limit or constraint 320, $$\left|\frac{a_{ymax}}{V^2}\right|,$$

may, for example, be a maximum magnitude of trajectory curvature based on the maximum vehicle lateral acceleration, $a_{ymax}$, vehicle longitudinal velocity, V, and/or other variables. The magnitude of optimal path curvature 310 may, for example, be limited or constrained by trajectory curvature limit 320, $$\left|\frac{a_{ymax}}{V^2}\right|.$$

According to some embodiments, optimal path curvature 310 may be defined by a piece-wise linear function of trajectory curvature 312 and time 314, trajectory curvature 312 and longitudinal distance 316, or trajectory curvature 312 and other variables. Optimal path curvature 310 may, for example, include multiple path curvature segments, trajectory curvature parts, or curvature segments (e.g., path curvature segments 330, 332, 334, 336, 338, and/or 340 or other curve segments) connected by waypoints or breakpoints (e.g., waypoints 350, 352, 354, 356, and/or 358 or other waypoints). Waypoints may, for example, be the points or transitions between curve segments, points at which the slope or characteristics of optimal path curvature 310 change, and/or other points.

According to some embodiments, during first path curvature segment 330 and second path curvature segment 332, host vehicle 10 may increase to maximum curvature or another curvature to steer away from the object 202. During third path curvature segment 334, host vehicle 10 may, for example, have avoided object 202 and may be reducing curvature to maximum negative curvature or other curvature to correct and/or compensate path curvature after avoiding object 202. During fourth path curvature segment 336, path curvature may, for example, remain constant and vehicle 10 may counter steer to correct or align vehicle position in target lane 230. During fifth path curvature segment 338, path curvature may, for example, be adjusted to match target lane. Other path curvature, vehicle paths, and vehicle maneuvers may of course be used.

According to some embodiments, a first path curvature segment 330 may define or represent the beginning of the collision avoidance maneuver. In first path curvature segment 330, trajectory curvature 312 may, for example, increase at a rate equal to or less than trajectory curvature rate constraint 322, $$\frac{\eta_{max}}{V^3},$$

or another rate to a maximum trajectory curvature value (e.g., equal to trajectory curvature constraint 320, $$\left|\frac{a_{ymax}}{V^2}\right|)$$

or trajectory curvature value at a first waypoint 350, $x_1$. Second path curvature segment 332 may be bounded by, lie between, or be between a first waypoint 350, $x_1$, and a second waypoint 352, $x_2$. Trajectory curvature 312 may, for example, be constant in second path curvature segment 332 and may, for example, be equivalent to trajectory curvature constraint 320, $$\left|\frac{a_{ymax}}{V^2}\right|$$

or another trajectory curvature.

In a third curve segment 334, which may begin at second waypoint 352, $x_2$, trajectory curvature 312 may decrease at a rate equal to or less than trajectory curvature rate constraint 322, $$\frac{\eta_{max}}{V^3},$$

or another rate to a minimum trajectory curvature value (e.g., trajectory curvature constraint 320, $$\left|\frac{a_{ymax}}{V^2}\right|)$$

or another trajectory curvature value at a third waypoint 354, $x_3$. In a fourth curve segment 336, which may begin at third waypoint 354, $x_3$, trajectory curvature 312 may remain constant at a minimum trajectory curvature value (e.g., trajectory curvature constraint 320, $$\left|\frac{a_{ymax}}{V^2}\right|)$$

or another trajectory curvature value to a fourth waypoint 356, $x_4$. In a fifth curve segment 338, which may begin at fourth waypoint 356, $x_4$, trajectory curvature 312 may increase at a rate equal to or less than trajectory curvature rate constraint 322, $$\frac{\eta_{max}}{V^3},$$

or another rate to a fifth waypoint 358, $x_5$. Sixth curve segment 340, which may begin at fifth waypoint 358, $x_5$, may lie on, follow, or be defined by the target lane curvature. Target lane curvature may, for example, be defined by the lane curvature of target lane 230 (e.g., a lane adjacent to or in near object 202 or another lane) and/or path along the road. Thus, path curvature segments (e.g., segments 330, 332, 334, 336, 338, and/or 340) may be limited by a trajectory curvature rate constraint 322 and the magnitude of the linear optimal path curvature segments may be limited by a trajectory curvature constraint 320. Other numbers of waypoints and curve segments may be used.

Figure 5:
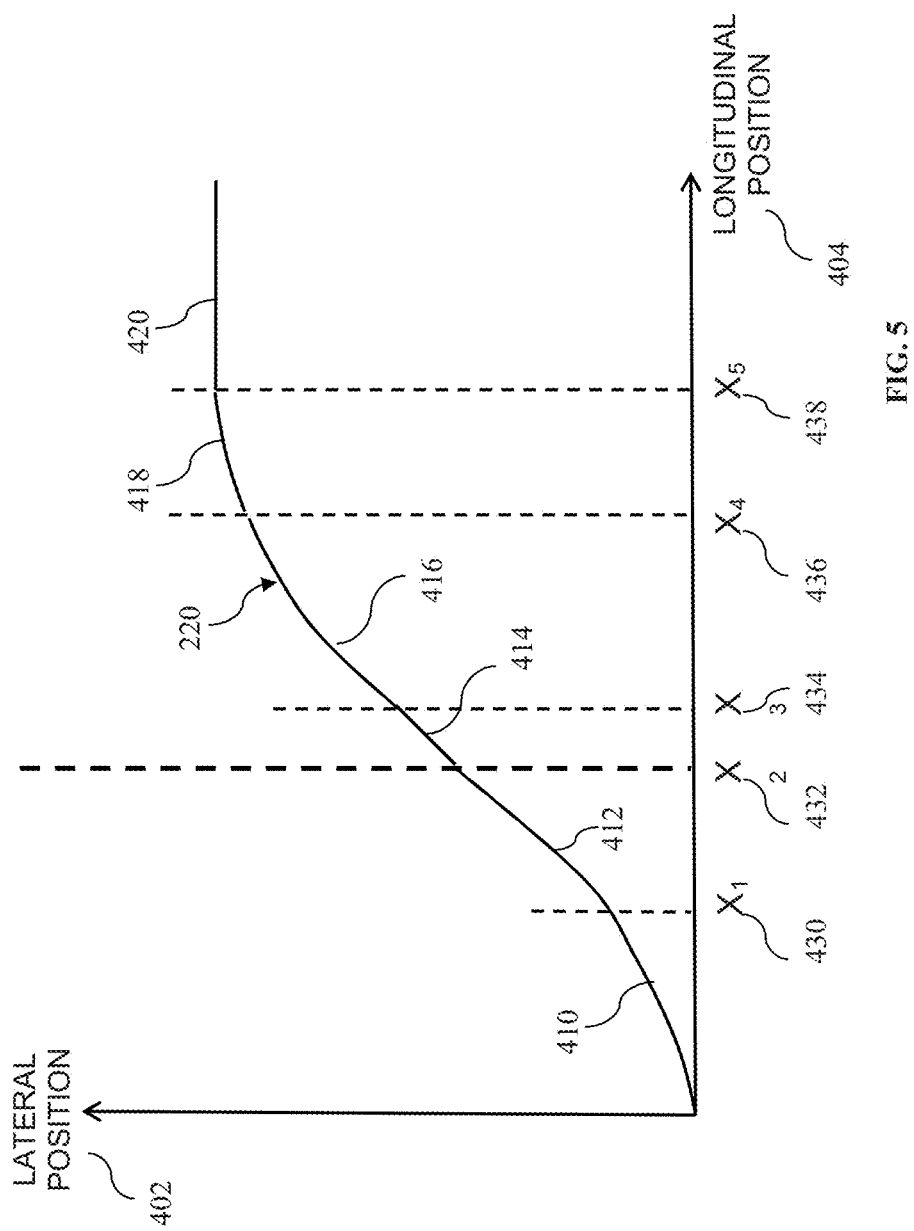
FIG. 5 is a graph of vehicle lateral position versus vehicle longitudinal position representing an optimal vehicle path around an object according to embodiments of the present invention.

FIG. 5 is a graph of vehicle lateral position versus vehicle longitudinal position representing an optimal vehicle path around an object according to embodiments of the present invention. Optimal or desired vehicle path 220 around object 202 may be defined in vehicle 10 reference frame (e.g., a vehicle based coordinate system) or another reference frame. For example, the origin of the reference frame may be the center of gravity (CG) of vehicle 10 or another location in vehicle. Optimal vehicle path 220 may, in some embodiments, be a function of or related to lateral offset, lateral position, or vehicle lateral position 402 and longitudinal position or vehicle longitudinal position 404.

According to some embodiments, optimal vehicle path 220 may be determined or calculated based on optimal path curvature 310. In some embodiments, optimal vehicle path 220, y(x), may be related to trajectory curvature 312, κ, by an equation such as:

$$\kappa = \frac{y''(x)}{(1 + y'(x))^{3/2}}$$

Trajectory curvature 312, κ, may, for example, be related to the second derivative of optimal path, y"(x), the first derivative of optimal path, y'(r), and possibly other parameters or variables. According to some embodiments, optimal path 220, y(x), may be calculated based on optimal path curvature 310, which may be a function of or related to trajectory curvature 312, κ, and longitudinal vehicle position 316, x. Optimal path 220, y(x), may, for example, be calculated based on optimal curvature 310 by integrating optimal path curvature 310 twice with respect to longitudinal position 316, x, (e.g., determining or calculating a second integral of optimal path curvature 310). Optimal vehicle path 220, y(x), resulting from integrating optimal curvature 310 twice with respect to longitudinal position 316, x, may, for example, be multiple quadratic, cubic and/or other order function(s) or path segments (e.g., path segments or parts 410, 412, 414, 416, 418, and 420 and/or other segment(s) or part(s)) separated by waypoints (e.g., waypoints 430, 432, 434, 436, and/or 438 or other waypoints). Waypoints may, for example, be determined by matching conditions for optimal vehicle path 220, y(x), the first derivative of optimal vehicle path, y'(x), and the second derivative of optimal vehicle path, y"(x), at the waypoints (e.g., points or transitions between curve segments).

According to some embodiments, optimal path 220 may include one or more path segment(s) or part(s). First path segment or part 410, $y_1(x)$, may, for example, be a cubic function (e.g., third order function) or other type function, which defines optimal vehicle path 220 from the starting point of the collision avoidance maneuver (e.g., the longitudinal point x=0 or another point) to a first waypoint 430, $x_1$. First path segment 410, $y_1(x)$, may, for example, be related to a parameter, $a_1$, and longitudinal distance, x, by an equation such as:

$$y_1(x) = \frac{a_1 x^3}{6}, x \in [0, x_1]$$

Parameter, $a_1$, may, for example, be related to lateral acceleration rate constraint (e.g., jerk), $\eta_{max}$, and vehicle longitudinal velocity, V, by an equation such as:

$$a_1 = \frac{\eta_{max}}{V^3}$$

According to some embodiments, first waypoint 430, $x_1$, may be related to lateral acceleration constraint, $a_{ymax}$, and lateral acceleration rate constraint (e.g., jerk), $\eta_{max}$, and vehicle longitudinal velocity, V, by an equation such as:

$$x_1 = \frac{V a_{ymax}}{\eta_{max}}$$

According to some embodiments, second path segment or part 412, $y_2(x)$, may, for example, be a quadratic function (e.g., second order function) or other type of function, which defines optimal vehicle path 220 from first waypoint 430, $x_1$, to second waypoint 432, $x_2$. Second path segment 412, $y_2(x)$, may, for example, be related to longitudinal distance, x, parameter, $b_2$, parameter, $c_2$, parameter, $d_2$, and first waypoint 430, $x_1$, by an equation such as:

$$y_2(x) = \frac{b_2(x-x_1)^2}{2} + c_2(x-x_1) + d_2, x \in [x_1, x_2]$$

According to some embodiments, parameter, $b_2$, parameter, $c_2$, and parameter, $d_2$, may be determined or calculated by matching conditions (e.g., continuity of optimal path 220, y(x), the first derivative of optimal path, y'(x), and the second derivative of optimal path, y"(x)) at first waypoint 430, $x_1$. Parameter, $b_2$, parameter, $c_2$, and parameter, $d_2$, may, for example, be related to parameter, $a_1$, and first waypoint 430, $x_1$, by equations such as:

$$d_2 = \tfrac{1}{6} a_1 x_1^3; c_2 = \tfrac{1}{2} a_1 x_1^2; b_2 = a_1 x_1$$

According to some embodiments, third path segment or part 414, $y_3(x)$, may, for example, be a cubic function (e.g., third order function) or other type of function, which defines optimal vehicle path 220 from second waypoint 432, $x_2$, to third waypoint 434, $x_3$. Third path segment 414, $y_3(x)$, may, for example, be related to longitudinal distance, x, parameter, $a_3$, parameter, $b_3$, parameter, $c_3$, parameter, $d_3$, and second waypoint 432, $x_2$, by an equation such as:

$$y_3(x) = \frac{a_3(x-x_2)^3}{6} + \frac{b_3(x-x_2)^2}{2} + c_3(x-x_2) + d_3, \, x \in [x_2, x_3]$$

According to some embodiments, third waypoint 434, $x_3$, may, for example, be related to second waypoint 432, $x_2$, and first waypoint 430, $x_1$, by an equation such as:

$$x_3 = x_2 + 2x_1$$

The relationship between third waypoint 434, $x_3$, second waypoint 432, $x_2$, and first waypoint 430, $x_1$, may, for example, be determined to maintain or approximate symmetry in optimal vehicle path 220.

According to some embodiments, parameter, $a_3$, parameter, $b_3$, parameter, $c_3$, and parameter, $d_3$, may be determined or calculated by matching conditions (e.g., continuity of optimal vehicle path 220, y(x), the first derivative of optimal vehicle path, y'(x), and the second derivative of optimal vehicle path, y"(x)) at second waypoint 432, $x_2$. Parameter, $a_3$, parameter, $b_3$, parameter, $c_3$, and parameter, $d_3$, may, for example, be related to parameter, $a_1$, parameter, $b_2$, parameter, $c_2$, parameter, $d_2$, first waypoint 430, $x_1$, and second waypoint 432, $x_2$, by equations such as:

$$d_3 = \tfrac{1}{2}b_2(x_2-x_1)^2 + c_2(x_2-x_1) + d_2; \, c_3 = b_2(x_2-x_1) + c_2;$$
$$b_3 = b_2; \, a_3 = -a_1$$

According to some embodiments, fourth path segment or part 416, $y_4(x)$, may, for example, be a quadratic function (e.g., second order function) or other type of function, which defines optimal vehicle path 220 from third waypoint 434, $x_3$, to fourth waypoint 436, $x_4$. Fourth path segment 416, $y_4(x)$, may, for example, be related to longitudinal distance, x, parameter, $b_4$, parameter, $c_4$, parameter, $d_4$, and third waypoint 434, $x_3$, by an equation such as:

$$y_4(x) = \frac{b_4(x-x_3)^2}{2} + c_4(x-x_3) + d_4, \, x \in [x_3, x_4]$$

According to some embodiments, parameter, $b_4$, parameter, $c_4$, and parameter, $d_4$, may be determined or calculated by matching conditions (e.g., continuity of optimal vehicle path 220, y(x), the first derivative of optimal vehicle path, y'(x), and the second derivative of optimal vehicle path, y"(x)) at third waypoint 434, $x_3$. Parameter, $b_4$, parameter, $c_4$, and parameter, $d_4$, may, for example, be related to parameter, $a_3$, parameter, $b_3$, parameter, $c_3$, parameter, $d_3$, second waypoint 432, $x_2$, and third waypoint 434, $x_3$, by equations such as:

$$d_4 = \tfrac{1}{6}a_3(x_3-x_2)^3 + \tfrac{1}{2}b_3(x_3-x_2)^2 + c_3(x_3-x_2) + d_3$$

$$c_4 = \tfrac{1}{2}a_3(x_3-x_2)^2 + b_3(x_3-x_2) + c_3; \, b_4 = a_3(x_3-x_2) + b_3$$

According to some embodiments, fifth path segment or part 418, $y_5(x)$, may, for example, be a cubic function (e.g., third order function) or other type function, which defines optimal vehicle path 220 from fourth waypoint 436, $x_4$, to fifth waypoint 438, $x_5$. Fifth path segment 418, $y_5(x)$, may, for example, be related to longitudinal distance, x, parameter, $a_5$, parameter, $b_5$, parameter, $c_5$, parameter, $d_5$, and fourth waypoint 436, $x_4$, by an equation such as:

$$y_5(x) = \frac{a_5(x-x_4)^3}{6} + \frac{b_5(x-x_4)^2}{2} + c_5(x-x_4) + d_5, \, x \in [x_4, x_5]$$

According to some embodiments, parameter, $a_5$, parameter, $b_5$, parameter, $c_5$, and parameter, $d_5$, may be determined or calculated by matching conditions (e.g., continuity of optimal vehicle path 220, y(x), the first derivative of optimal vehicle path, y'(x), and the second derivative of optimal vehicle path, y"(x)) at fourth waypoint 436, $x_4$. Parameter, $a_5$, parameter, $b_5$, parameter, $c_5$, and parameter, $d_5$, may, for example, be related to parameter, $a_1$, parameter, $b_4$, parameter, $c_4$, parameter, $d_4$, third waypoint 434, $x_3$, and fourth waypoint 436, $x_4$, by equations such as:

$$d_5 = \tfrac{1}{2}b_4(x_4-x_3)^2 + c_4(x_4-x_3) + d_4; \, c_5 = b_4(x_4-x_3) + c_4;$$
$$b_5 = b_4; \, a_5 = a_1$$

According to some embodiments, sixth path segment or part 420, $y_6(x)$, may, for example, match, lie on, and/or follow the path of the target lane path, $y_{lane}(x)$, (e.g., target lane 230 or target lane centerline). Target lane path, $y_{lane}(x)$, may, for example, be or may define the path of the lane adjacent to and/or next to object 202. Sixth path segment 420, $y_6(x)$, may, for example, be related to target lane path, $y_{lane}(x)$, by an equation such as:

$$y_6(x) = y_{lane}(x), \, x > x_5$$

According to some embodiments, target lane path, $y_{lane}(x)$, (e.g., target lane 230 or target lane centerline) may, for example, be described or represented by a quadratic function (e.g., second order function) or other type of function. In some embodiments, target lane path, $y_{lane}(x)$, may be related to lane curvature, $\beta$, lane heading, $\gamma$, lane offset, $\delta$, and fifth waypoint 438, $x_5$, by an equation such as:

$$y_{lane} = \tfrac{1}{2}\beta x_5^2 + \gamma x + \delta$$

According to some embodiments, third waypoint 434, $x_3$, fourth waypoint 436, $x_4$, and fifth waypoint 438, $x_5$, may be determined or calculated by matching conditions (e.g., continuity of optimal path 220, y(x), the first derivative of optimal path, y'(x), and the second derivative of optimal path, y"(x)) at fifth waypoint 438, $x_5$. Fourth waypoint 436, $x_4$, and fifth waypoint 438, $x_5$, may, for example, be related to parameter, $a_5$, parameter, $b_5$, parameter, $c_5$, parameter, $d_5$, lane curvature, $\beta$, lane heading, $\gamma$, and lane offset, $\delta$, by equations such as:

$$\tfrac{1}{6}a_5(x_5-x_4)^3 + \tfrac{1}{2}b_5(x_5-x_4)^2 + c_5(x_5-x_4) + d_5 = \tfrac{1}{2}\beta x_5^2 + \gamma x_5 + \delta$$

$$\tfrac{1}{2}a_5(x_5-x_4)^2 + b_5(x_5-x_4) + c_5 = \beta x_5 + \gamma$$

$$a_5(x_5-x_4) + b_5 = \beta$$

Using the above equations, fifth waypoint 438, $x_5$, may, for example, be expressed in terms of fourth waypoint 436, $x_4$, lane curvature, $\beta$, parameter, $b_2$, and parameter, $a_1$, or, alternatively, fourth waypoint 436, $x_4$, lane curvature, $\beta$, vehicle longitudinal velocity, V, lateral acceleration constraint, $a_{ymax}$, and lateral acceleration rate constraint (e.g., jerk), $\eta_{max}$, using equations such as:

$$x_5 = x_4 + \frac{\beta + b_2}{a_1} = x_4 + \frac{\beta V^3 + V a_{ymax}}{\eta_{max}}$$

According to some embodiments, second waypoint 432, $x_2$, fourth waypoint 436, $x_4$, and fifth waypoint 438, $x_5$, may be determined or calculated using simultaneous equation solution techniques, simultaneously non-linear equation solution techniques, numerical methods, algebraic methods, or another mathematical approach. For example, second waypoint 432, $x_2$, may be expressed in terms of fourth waypoint 436, $x_4$, and/or other variables or parameters. The relationship between second waypoint 432, $x_2$, and fourth waypoint 436, $x_4$, may, in some embodiments, be a linear (e.g., first order) or other order relationship. In order to determine second waypoint 432, $x_2$, and/or other waypoints, simultaneous non-linear equation solution techniques or another mathematical approach may be used to calculate or determine a quadratic equation with respect to second waypoint 432, $x_2$. The coefficients of the quadratic equation may, for example, be determined using numerical solution techniques or another mathematical approach. The quadratic equation may, for example, be solved explicitly to determine second waypoint 432, $x_2$. Third waypoint 434, $x_3$, may, for example, be determined or calculated based on second waypoint 432, $x_2$, and first waypoint 430, $x_1$.

According to some embodiments, optimal path 220 may be a continuously differentiable function with respect to time and/or longitudinal position and may include first path segment 410, $y_1(x)$, second path segment 412, $y_2(x)$, third path segment 414, $y_3(x)$, fourth path segment 416, $y_4(x)$, fifth path segment 418, $y_5(x)$, and sixth path segment 420, $y_6(x)$. Each of the path segment(s) may, for example, be connected to or intersect with adjacent path segments at waypoints (e.g., waypoints 430, 432, 434, 436, and/or 438 or other waypoints). Optimal or desired vehicle path 220 may, for example, be output or transferred to a vehicle collision avoidance control system or device 100.

Figure 6:
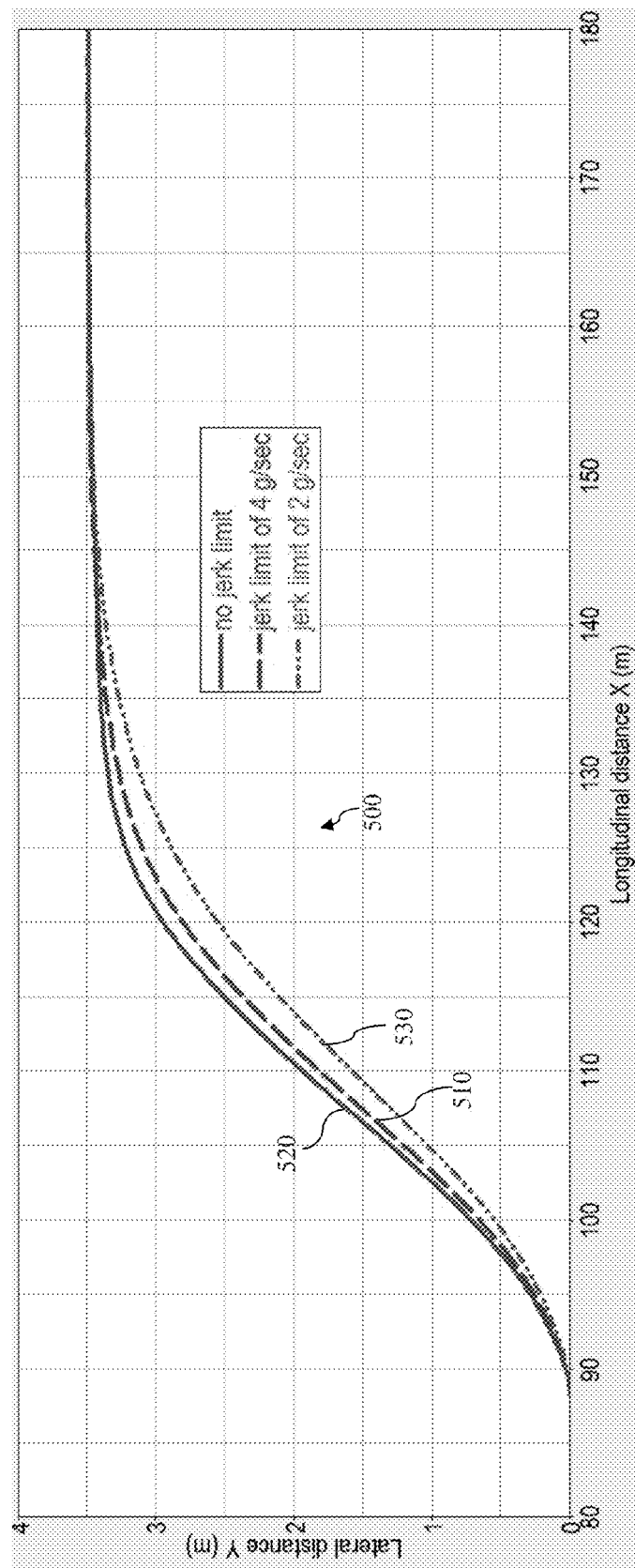
FIG. 6 is a graph of vehicle lateral position with respect to vehicle longitudinal position, and shows that a jerk constraint may have an effect on vehicle collision avoidance maneuvers.

FIG. 6 is a graph of vehicle lateral position with respect to vehicle longitudinal position, and shows that a jerk constraint may have an effect on vehicle collision avoidance maneuvers. Graph 500 represents an example vehicle path during multiple simulated collision avoidance maneuvers. Graph segment 510 and graph segment 520 may, for example, represent vehicles traveling at a longitudinal velocity, V, or speed of 100 kilometers per hour (kph) or another speed or velocity. Graph segment 510 may represent a vehicle path during a collision avoidance maneuver with a constraint or limit on lateral acceleration rate or jerk (e.g., 4 g/sec or another value). Graph segment 530 may represent a vehicle path during a collision avoidance maneuver with a constraint or limit on lateral acceleration rate or jerk (e.g., 2 g/sec or another value). Graph segment 520 may represent a vehicle path during a collision avoidance maneuver without a constraint or limit on lateral acceleration rate (e.g., jerk). The vehicle path represented by graph segment 530 (e.g., vehicle path with a jerk limit or constraint of 2 g/sec) may be a smoother path than the vehicle path represented by graph segment 510 (e.g., vehicle path with a jerk limit or constraint of 4 g/sec). The vehicle path represented by graph segment 510 (e.g., vehicle path with a jerk constraint) may be a smoother path than the vehicle path represented by graph segment 520 (e.g., vehicle path without a jerk constraint). Reducing the jerk constraint or limit or constraint may, for example, increase the smoothness of optimal vehicle path 220. Reducing the jerk constraint may, for example, increase the amount of time required for vehicle 10 to maneuver around object 202. For example, the vehicle path represented by graph segment 530 may require a greater amount of time and longitudinal distance to maneuver around object 202 (e.g., to avoid collision with object) than vehicle path represented by graph segment 510. The vehicle path represented by graph segment 510 may, for example, require a greater amount of time (e.g., 0.4-0.6 seconds or another time) and longitudinal distance to maneuver around object 202 (e.g., to avoid collision with object) than vehicle path represented by graph segment 520. Decreasing the jerk constraint value may, therefore, result in a smoother vehicle path 220 but may require more time to maneuver around object 202. Of course, other vehicles, and other embodiments, may correspond to graphs with different data.

Figure 7:
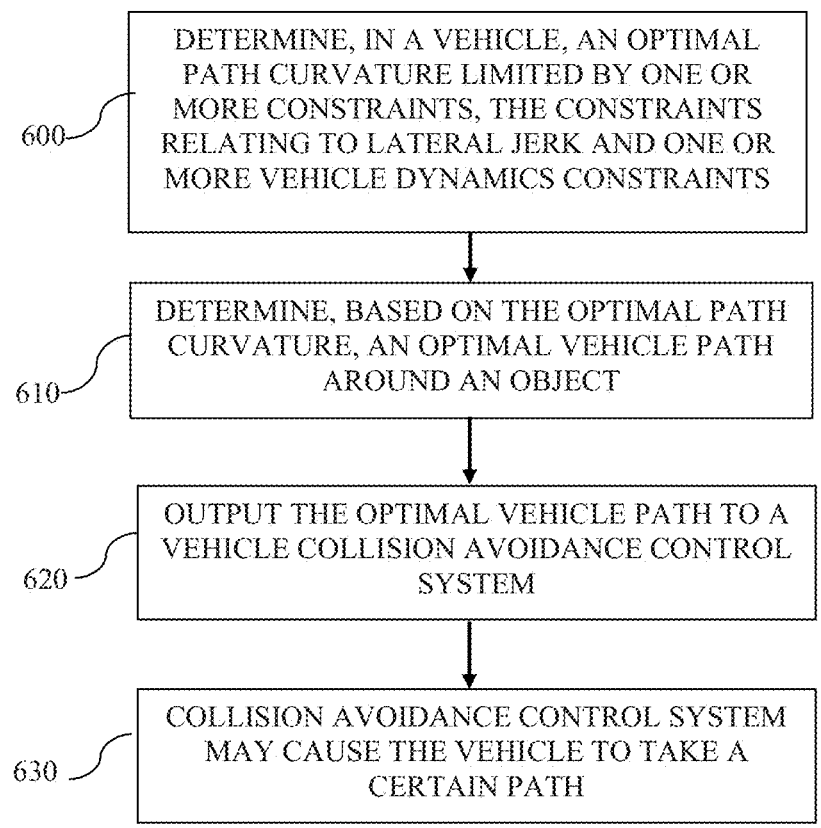
FIG. 7 is a flowchart of a method according to embodiments of the present invention.

FIG. 7 is a flowchart of a method according to embodiments of the present invention. In operation 600, an optimal path curvature (e.g., optimal path curvature 310 of FIG. 4) limited by one or more constraints (e.g., trajectory curvature constraint 320 and trajectory curvature rate constraint 322 of FIG. 4) may be determined. The constraints may relate to lateral jerk and one or more vehicle dynamics constraints (e.g., lateral acceleration constraint). Optimal path curvature 310 may include, for example, one or more path segments (e.g., path curvature segments 330, 332, 334, 336, 338, and/or 340 of FIG. 4) and one or more waypoints (e.g., waypoints 350, 352, 354, 356, and/or 358 of FIG. 4).

In operation 610, based on the optimal path curvature, an optimal vehicle path (e.g., optimal vehicle path 220 of FIG. 3) around an object (e.g., object 202 of FIG. 3) may be determined.

In operation 620, the optimal vehicle path may be output to a collision avoidance control system (e.g., collision avoidance control system or device 100 of FIG. 1).

In operation 630, a collision avoidance control system may cause (e.g., via an EPS or AFS) the vehicle to take a certain path.

Other or different series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for performing a vehicular, collision avoidance maneuver comprising:

using a processor in the vehicle to determine a travel path from sensor data responsively to detection of a threshold distance between a vehicle and an object, the travel path having a series of path segments defined by alternating cubic and quadratic polynomial equations, wherein each of the cubic equations has a second derivative whose slope defines a trajectory curvature rate constraint, wherein each of the quadratic equations has a second derivative whose constant value defines a trajectory curvature limit, wherein lateral position y and longitudinal position x are measured from a center of gravity of the vehicle such that:

a first path segment of the series of path segments is defined as:

$$y_1(x) = \frac{a_1 x^3}{6}, x \in [0, x_1],$$

wherein $$a_1 = \frac{\eta_{max}}{V^3},$$

wherein $\eta_{max}$ is lateral acceleration rate constraint and V is vehicle longitudinal velocity;

a second path segment of the series of path segments is defined as:

$$y_2(x) = \frac{b_2(x-x_1)^2}{2} + c_2(x-x_1) + d_2, x \in [x_1, x_2],$$

wherein $d_2 = \frac{1}{6}a_1 x_1^3$, $c_2 = \frac{1}{2}a_1 x_1^2$, and $b_2 = a_1 x_1$;

a third path segment of the series of path segments is defined as:

$$y_3(x) = \frac{a_3(x-x_2)^3}{6} + \frac{b_3(x-x_2)^2}{2} + c_3(x-x_2) + d_3, x \in [x_2, x_3],$$

wherein $d_3 = \frac{1}{2}b_2(x_2-x_1)^2 + c_2(x_2-x_1) + d_2$, and $c_3 = b_2(x_2-x_1) + c_2$, $b_3 = b_2$, and $a_3 = -a_1$;

a fourth path segment of the series of path segments is defined as:

$$y_4(x) = \frac{b_4(x-x_3)^2}{2} + c_4(x-x_3) + d_4, x \in [x_3, x_4],$$

wherein $d_4 = \frac{1}{6}a_3(x_3-x_2)^3 + \frac{1}{2}b_3(x_3-x_2) + c_3(x_3-x_2) + d_3$, $c_4 = \frac{1}{2}a_3(x_3-x_2)^2 + b_3(x_3-x_2) + c_3$, and $b_4 = a_3(x_3-x_2) + b_3$;

a fifth path segment of the series of path segments is defined as:

$$y_5(x) = \frac{a_5(x-x_4)^3}{6} + \frac{b_5(x-x_4)^2}{2} + c_5(x-x_4) + d_5, x \in [x_4, x_5],$$

wherein $d_5 = \frac{1}{2}b_4(x_4-x_3)^2 + c_4(x_4-x_3) + d_4$, $c_5 = b_4(x_4-x_3) + c_4$, $b_5 = b_4$, and $a_5 = a_1$; and guiding the vehicle in accordance with the series of path segments.

2. The method of claim 1, wherein the processor is further configured to determine a sixth path segment of the series of path segments, the sixth path segment defined as $y_6(x) = y_{lane}(x)$, $x > x_5$, wherein $y_{lane} = \frac{1}{2}\beta x_5^2 + \gamma x_5 + \delta$, wherein $\beta$ is lane curvature, $\gamma$ is lane heading, and $\delta$ is lane offset.

3. The method of claim 1, wherein the lateral acceleration rate constraint has a value ranging between 1 g/s to about 2 g/s.

4. The method of claim 1, wherein the lateral acceleration constraint is implemented as 6 m/s².

5. The method of claim 3, wherein the lateral acceleration constraint is implemented as 6 m/s².

6. A system for determining a travel path for a vehicular collision avoidance maneuver comprising:

a processor in a vehicle configured to determine a travel path from sensor data responsively to detection of a threshold distance between the vehicle and an object, the travel path having a series of path segments defined by alternating cubic and quadratic polynomial equations, wherein each of the cubic equations has a second derivative whose slope defines a trajectory curvature rate constraint, wherein each of the quadratic equations has a second derivative whose constant value defines a trajectory curvature limit, wherein lateral position y and longitudinal position x are measured from a center of gravity of the vehicle such that:

a first path segment of the series of path segments is defined as:

$$y_1(x) = \frac{a_1 x^3}{6}, x \in [0, x_1],$$

wherein $$a_1 = \frac{\eta_{max}}{V^3},$$

wherein $\eta_{max}$ is lateral acceleration rate constraint and V is vehicle longitudinal velocity;

a second path segment of the series of path segments is defined as:

$$y_2(x) = \frac{b_2(x-x_1)^2}{2} + c_2(x-x_1) + d_2, x \in [x_1, x_2],$$

wherein $d_2 = \frac{1}{6}a_1 x_3^1$, $c_2 = \frac{1}{2}a_1 x_1^2$, and $b_2 = a_1 x_1$;

a third path segment of the series of path segments is defined as:

$$y_3(x) = \frac{a_3(x-x_2)^3}{6} + \frac{b_3(x-x_2)^2}{2} + c_3(x-x_2) + d_3, x \in [x_2, x_3],$$

wherein $d_3=\frac{1}{2}b_2(x_2-x_1)^2+c_2(x_2-x_1)+d_2$, and $c_3=b_2(x_2-x_1)+c_2$, $b_3=b_2$, and $a_3=-a_1$;

a fourth path segment of the series of path segments is defined as:

$$y_4(x) = \frac{b_4(x-x_3)^2}{2} + c_4(x-x_3) + d_4, x \in [x_3, x_4],$$

wherein $d_4=\frac{1}{6}a_3(x_3-x_2)^3+\frac{1}{2}b_3(x_3-x_2)+c_3(x_3-x_2)+d_3$, $c_4=\frac{1}{2}a_3(x_3-x_2)^2+b_3(x_3-x_2)+c_3$, and $b_4=a_3(x_3-x_2)+b_3$;

a fifth path segment of the series of path segments is defined as:

$$y_5(x) = \frac{a_5(x-x_4)^3}{6} + \frac{b_5(x-x_4)^2}{2} + c_5(x-x_4) + d_5, x \in [x_4, x_5],$$

wherein $d_5=\frac{1}{2}b_4(x_4-x_3)^2+c_4(x_4-x_3)+d_4$, and $c_5=b_4(x_4-x_3)+c_4$, and $b_5=b_4$, and $a_5=a_1$; and an automated steering control system configured to actuate steering in accordance with the series of path segments.

7. The system of claim 6, wherein the processor is further configured to determine a sixth path segment of the series of path segments defined as $y_6(x)=y_{lane}(x)$, $x>x_5$, wherein $y_{lane}=\frac{1}{2}\beta x_5^2+\gamma x_5+\delta$, wherein $\beta$ is lane curvature, $\gamma$ is lane heading, and $\delta$ is lane offset.

8. The system of claim 6, wherein the lateral acceleration rate constraint has a value ranging between 1 g/s to about 2 g/s.

9. The system of claim 6, wherein the lateral acceleration constraint is implemented as 6 m/s$^2$.

10. The system of claim 8 wherein the lateral acceleration constraint is implemented as 6 m/s$^2$.

* * * * *